(12) United States Patent
Ishida

(10) Patent No.: US 11,828,633 B2
(45) Date of Patent: Nov. 28, 2023

(54) MEASUREMENT APPARATUS, MEASUREMENT METHOD, AND COMPUTER-READABLE RECORDING MEDIUM

(71) Applicant: NEC Corporation, Tokyo (JP)

(72) Inventor: Kousuke Ishida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 350 days.

(21) Appl. No.: 17/275,445

(22) PCT Filed: Aug. 16, 2019

(86) PCT No.: PCT/JP2019/032189
§ 371 (c)(1),
(2) Date: Mar. 11, 2021

(87) PCT Pub. No.: WO2020/054315
PCT Pub. Date: Mar. 19, 2020

(65) Prior Publication Data
US 2022/0049981 A1    Feb. 17, 2022

(30) Foreign Application Priority Data
Sep. 14, 2018  (JP) ................ 2018-172724

(51) Int. Cl.
*G01F 1/34* (2006.01)
*A01C 23/04* (2006.01)
*A01G 25/00* (2006.01)

(52) U.S. Cl.
CPC .............. *G01F 1/34* (2013.01); *A01C 23/042* (2013.01); *A01G 25/00* (2013.01)

(58) Field of Classification Search
CPC ......... G01F 1/34; A01C 23/042; A01G 25/00; A01G 25/16; G01L 9/0027
See application file for complete search history.

(56) References Cited

U.S. PATENT DOCUMENTS 6,260,416 B1    7/2001  Joswig et al.
6,957,588 B1 *  10/2005  Kicher ................. G01L 9/0027
                                                      73/726
(Continued)

FOREIGN PATENT DOCUMENTS

DE    102010029119 A1    11/2011
GB       2543060 A        4/2017
(Continued)

OTHER PUBLICATIONS

Engiish translation of Written opinion for PCT Application No. PCT/JP20191032189, dated Sep. 24, 2019.
(Continued)

*Primary Examiner* — Peter J Macchiarolo
*Assistant Examiner* — John M Royston

(57) ABSTRACT

The present invention provides a measurement apparatus 1 including: a detection unit 2 configured to detect a pressure according to a shape change of a tubular structure whose shape changes according to a supplied amount of a liquid that flows therein; a time specification unit 3 configured to specify, based on the pressure detected by the detection unit 2, a supply time during which the liquid was supplied; and a supplied amount calculation unit 4 configured to calculate a supplied amount of the liquid based on the supply time.

10 Claims, 8 Drawing Sheets

(56) References Cited

U.S. PATENT DOCUMENTS

| | | | | |
|---|---|---|---|---|
| 2011/0137827 A1* | 6/2011 | Mason, Sr. | ............ | G06Q 10/06 |
| | | | | 702/182 |
| 2013/0220027 A1* | 8/2013 | Calderin | .................. | G01F 1/34 |
| | | | | 73/863.02 |
| 2014/0144246 A1 | 5/2014 | Drahm et al. | | |
| 2014/0260667 A1* | 9/2014 | Berkcan | .................... | G01F 1/66 |
| | | | | 73/861.28 |

FOREIGN PATENT DOCUMENTS

| | | |
|---|---|---|
| JP | S62-124418 A | 6/1987 |
| JP | H03-061526 U | 6/1991 |
| JP | 2002-005720 A | 1/2002 |
| JP | 2002-131096 A | 5/2002 |
| JP | 2004-124599 A | 4/2004 |
| JP | 2011-150060 A | 8/2011 |
| WO | 2014/048911 A1 | 4/2014 |

OTHER PUBLICATIONS

Extended European Search Report for EP Application No. EP19860640.2 dated Oct. 12, 2021.
International Search Report for PCT Application No. PCT/JP2019/032189, dated Sep. 24, 2019.
Japanese Office Action for JP Application No. 2018-172724 dated Sep. 24, 2019 with English Translation.

\* cited by examiner

A

CONTRACTION

B

EXPANSION ic # MEASUREMENT APPARATUS, MEASUREMENT METHOD, AND COMPUTER-READABLE RECORDING MEDIUM

This application is a National Stage Entry of PCT/JP2019/032189 filed on Aug. 16, 2019, which claims priority from Japanese Patent Application 2018-172724 filed on Sep. 14, 2018, the contents of all of which are incorporated herein by reference, in their entirety.

TECHNICAL FIELD

The present invention relates to a measurement apparatus and a measurement method that measure a supplied amount of a liquid, and further relates to a computer-readable recording medium where a program for realizing these is recorded.

BACKGROUND ART

Conventionally, in a large-scale field, irrigation has been performed in order to maintain an appropriate amount of soil moisture in the entire field. As main irrigation methods, for example, (1) furrow irrigation, (2) sprinkler irrigation, and (3) drip irrigation are known.

(1) Furrow irrigation is primitive irrigation and is not suitable for a large-scale field in terms of efficiency of utilizing irrigation water (liquid).

(2) Sprinkler irrigation is a method in which irrigation water is sprinkled using a sprinkler, and is suitable for a large-scale field. Also, according to sprinkler irrigation, equipment cost can be significantly reduced as compared with the drip irrigation described later.

(3) Drip irrigation is a method in which a drip tube for irrigation is laid in a field and irrigation water is supplied so as to drip on an agricultural crop from a drip provided in the drip tube.

Incidentally, in cultivation of an agricultural crop, it is commonly important to provide an appropriate amount of water and fertilizer according to the growth stage. This is notable in vegetables such as tomatoes, which require delicate water management and fertilizer management.

According to drip irrigation, irrigation water can be supplied in a pinpoint manner to roots of the crop, so drip irrigation can be managed more delicately than (1) furrow irrigation and (2) delicate sprinkler irrigation. Also, in drip irrigation, a liquid obtained by mixing fertilizer with water can be used as irrigation water. Furthermore, in drip irrigation, fertilizer is supplied in a state mixed with water, so delicate fertilizer management is possible. Thus, drip irrigation is suitable for cultivation of agricultural crops such as tomatoes that require delicate water management and fertilizer management.

Also, in drip irrigation, although the equipment cost is high, an appropriate amount of water can be efficiently supplied to the agricultural crop, so compared to sprinkler irrigation, drip irrigation can supply water to the agricultural crop more reliably, and the amount of water used can be significantly reduced. Therefore, drip irrigation is mainly adopted when cultivating an agricultural crop that requires delicate management of the amount of soil moisture.

Note that, as related technology, Patent Document 1 discloses a system for mechanically controlling the supplied amount of irrigation water in irrigation. Specifically, in the system disclosed in Patent Document 1, the supplied amount of irrigation water is managed based on data output from a sensor and prediction data regarding the weather and moisture in the soil by opening a valve when judged that the amount of moisture in the soil has reached a lower limit, and closing the valve when judged that the amount of moisture has reached an upper limit.

LIST OF RELATED ART DOCUMENTS

Patent Documents

Patent Document 1: Japanese Patent Laid-Open Publication No. 2004-124599

SUMMARY OF INVENTION

Solution to Problems

However, in a field where drip irrigation is actually adopted, the amount of irrigation water supplied is often managed manually. Specifically, a worker, according to a plan formulated by a manager, opens a supply valve at a start date/time for supplying irrigation water, and closes the supply valve at an end date/time. Also, the worker creates a work record regarding this work.

Therefore, there may be a discrepancy between the date/time when the worker opens/closes the valve, and the start date/time and end date/time that was set according to the plan. This discrepancy varies from worker to worker. Also, since the worker opens/closes the valve, the supply amount of irrigation water to be supplied to a section may not be appropriate. Furthermore, since the work record is also created by the worker, the work record is not always recorded accurately. Thus, conventionally, management of irrigation water is implemented manually, so delicate management of the supplied amount of irrigation water is currently difficult.

Also, in the system disclosed in Patent Document 1, it is not assumed that the amount of moisture is measured for each section, so in a case where the supply amount of irrigation water to be supplied in each section is different, the disclosed system is not applicable as-is to drip irrigation. If this system is applied to drip irrigation, there will be a large error compared to the appropriate supply amount of irrigation water to be supplied in each section.

It is conceivable that the above problem can be solved by introducing the system disclosed in Patent Document 1 such that data prediction and supply valve control can be performed for each section, but in this case, equipment costs will increase.

An example object of the present invention is to provide a measurement apparatus, a measurement method, and a computer-readable recording medium that manage the supplied amount of a liquid while suppressing an increase in the cost of equipment using a tubular structure.

Solution to the Problems

In order to achieve the example object described above, a measurement apparatus according to an example aspect of the present invention includes:
- a detection unit configured to detect a pressure according to a shape change of a tubular structure whose shape changes according to a supplied amount of a liquid that flows therein;
- a time specification unit configured to specify, based on the pressure detected by the detection unit, a supply time during which the liquid was supplied; and a supplied amount calculation unit configured to calculate a supplied amount of the liquid based on the supply time.

Also, in order to achieve the example object described above, a measurement method according to an example aspect of the present invention includes:

(a) a step of detecting a pressure according to a shape change of a tubular structure whose shape changes according to a supplied amount of a liquid that flows therein;
(b) a step of specifying, based on the detected pressure, a supply time during which the liquid was supplied; and
(c) a step of calculating a supplied amount of the liquid based on the supply time.

Furthermore, in order to achieve the example object described above, a computer-readable recording medium according to an example aspect of the present invention includes a program recorded on the computer-readable recording medium and including instructions that cause a computer to carry out:

(a) a step of acquiring a pressure according to a shape change of a tubular structure whose shape changes according to a supplied amount of a liquid that flows therein;
(b) a step of specifying, based on the acquired pressure, a supply time during which the liquid was supplied; and
(c) a step of calculating a supplied amount of the liquid based on the supply time.

Advantageous Effects of the Invention

As described above, according to the present invention, it is possible to manage the supplied amount of a liquid while suppressing an increase in the cost of equipment using a tubular structure.

BRIEF DESCRIPTION OF THE DRAWINGS

FIG. 5A shows a case when the tubular structure is contracted,
and FIG. 5B shows a case when the tubular structure is expanded.

EXAMPLE EMBODIMENT

Example Embodiment

Below, an example embodiment of the present invention will be described with reference to FIGS. 1 to 8.

[Apparatus Configuration]

Figure 1:
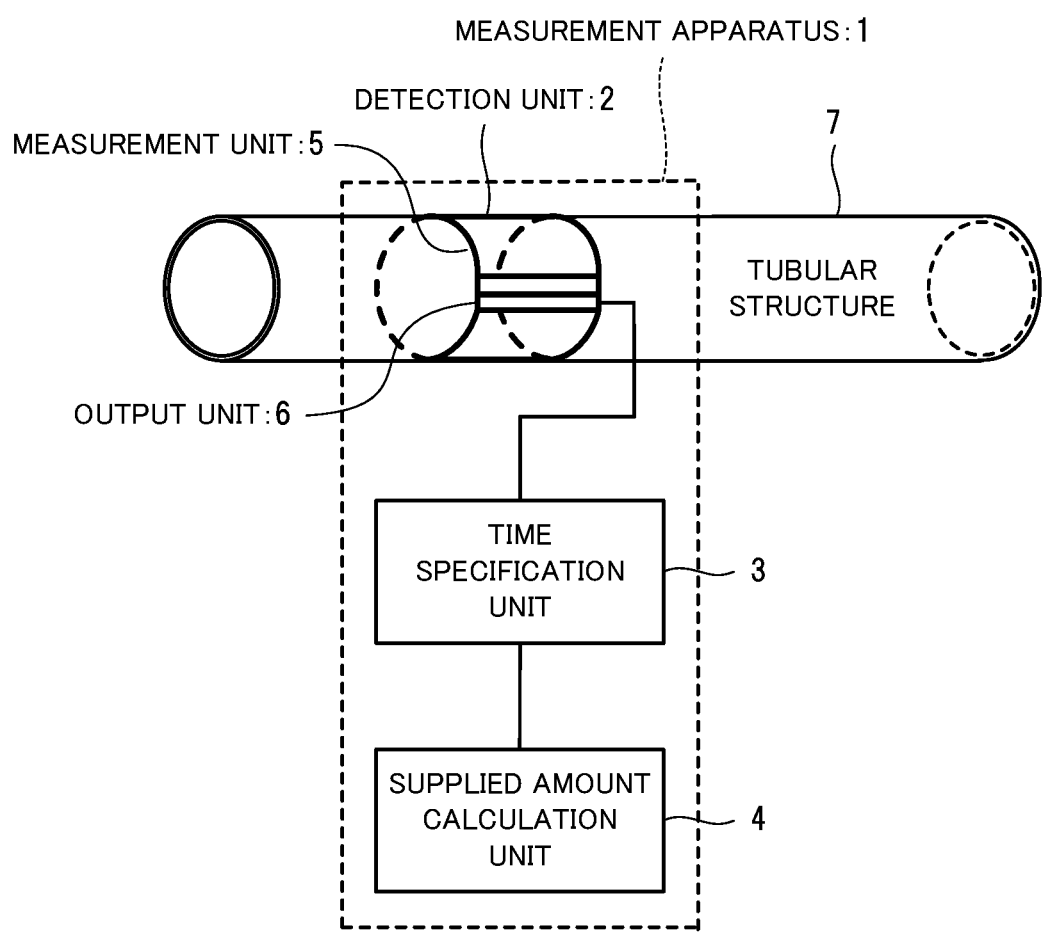
FIG. 1 illustrates an example of a measurement apparatus.

First, the configuration of a measurement apparatus according to the present example embodiment will be described with reference to FIG. 1. FIG. 1 illustrates an example of the measurement apparatus.

As shown in FIG. 1, the measurement apparatus 1 has a detection unit 2, a time specification unit 3, and a supplied amount calculation unit 4. Also, the detection unit 2 has a measurement unit 5 and an output unit 6. Further, the measurement device 1 shown in FIG. 1 is an apparatus capable of managing the supplied amount of a liquid while suppressing an increase in the cost of equipment (for example, drip irrigation equipment) using a tubular structure 7.

Of these, the detection unit 2 detects a pressure according to a shape change of the tubular structure 7, whose shape changes according to the supplied amount of a liquid that flows therein. The tubular structure 7, for example, is a tube (for example, an irrigation tube) configured using a material such as resin or rubber. The time specification unit 3 specifies, based on the pressure detected by the detection unit 2, a supply time during which the liquid was supplied. The supplied amount calculation unit 4 calculates a supplied amount of the liquid based on the supply time.

As described above, according to the present example embodiment, the measurement apparatus 1 can detect the pressure corresponding to the shape change of the tubular structure 7 by using the detection unit 2, which is attached to the tubular structure 7. Specifically, in the measurement apparatus 1, the measurement unit 5 of the detection unit 2 is attached to the exterior portion of the tubular structure 7, and the measurement apparatus 1 can measure the pressure (pressure sensitivity) that the tubular structure 7 applies to the measurement unit 5 according to the shape change of the tubular structure 7.

Further, according to the present example embodiment, since the supply time during which the liquid was supplied to the tubular structure 7 can be specified based on the detected pressure, it is possible to calculate the supplied amount of the liquid based on the supply time. As a result, the supplied amount of the liquid can be delicately managed.

Also, according to the present example embodiment, since the liquid supply time can be specified, it is possible to confirm whether the supplied amount of the liquid was appropriate. That is, it is possible to confirm whether the supplied amount of the liquid was appropriate without using the work record created by a worker.

Furthermore, in the case of drip irrigation equipment, when precisely calculating the supplied amount of the irrigation water, conventionally, the supplied amount of the irrigation water is precisely calculated by adding a flow meter to the drip irrigation equipment, or by adding a valve that can automatically adjust the supplied amount of the irrigation water. However, this requires cutting the irrigation tube to attach the flow meter or valve. However, such attachment increases the cost of the drip irrigation equipment. Also, the manufacturer's warranty of the drip irrigation equipment will be voided. Furthermore, the risk of failure may increase.

However, according to the present example embodiment, the detection unit 2 can be attached to the exterior portion of the irrigation tube without damaging the irrigation tube, so the manufacturer's warranty of the drip irrigation equipment will not be voided. Further, since the detection unit 2 is attached by merely winding the detection unit 2 around the irrigation tube, it is possible to suppress an increase in the cost of the drip irrigation equipment as compared with the conventional technology.

Figure 2:
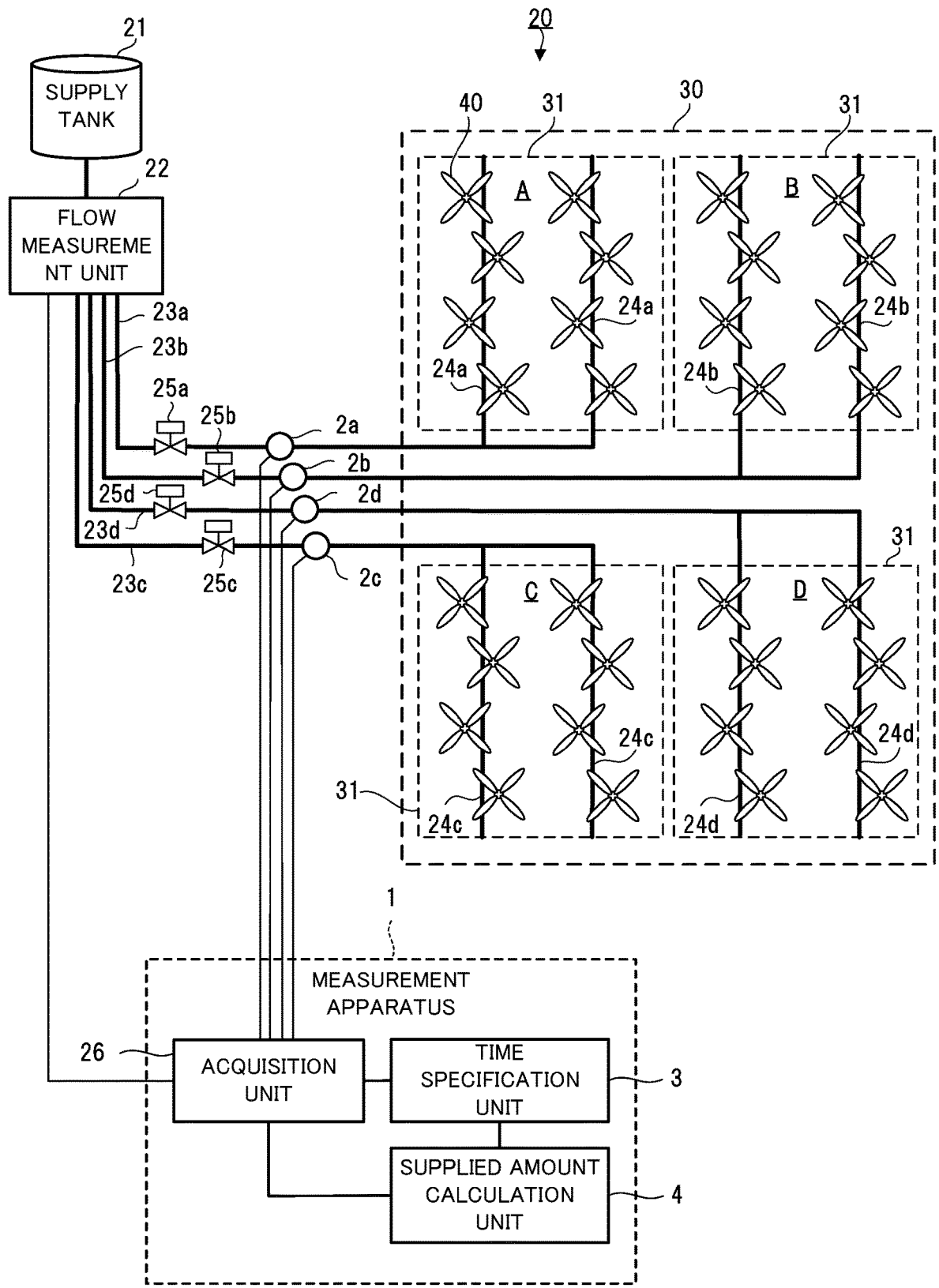
FIG. 2 illustrates an example of a system with the measurement apparatus.

Next, the configuration of the measurement apparatus 1 according to the present example embodiment will be described more specifically with reference to FIG. 2. FIG. 2 illustrates an example of a system with the measurement apparatus. The system 20 in the present example embodiment shown in FIG. 2 is an example in which the system 20 is applied in drip irrigation equipment. That is, in FIG. 2, the system 20 is an example in which the system 20 is applied to a field 30 shown in FIG. 2.

Specifically, the system 20, in addition to the measurement apparatus 1 with the detection unit 2, has a supply tank 21 (a supply source), a flow measurement unit 22, supply lines 23 (23a, 23b, 23c, and 23d), drip lines 24 (24a, 24b, 24c, and 24d), and valves 25 (25a, 25b, 25c, and 25d).

In the example shown in FIG. 2, the field 30 is divided into four sections 31 along ridges. In addition, letters A to D in FIG. 2 are assigned to the respective sections 31 for the purpose of description. Also, as shown in FIG. 2, a plurality of ridges are provided in the field 30, and a crop 40 is planted along the ridges.

The supply tank 21 is a supply source that stores the liquid to be supplied to the crop 40. Specifically, the supply tank 21 is connected to the flow measurement unit 22 through a pipe for supplying the irrigation water. The liquid may be, for example, irrigation water or a liquid obtained by mixing fertilizer with water.

The flow measurement unit 22 is installed in the supply tank 21 and measures the flow rate of the irrigation water supplied from the supply tank 21 to the field 30 through any of the supply lines 23. Specifically, the flow measurement unit 22 may be a pulse transmission-type flow meter. A pulse transmission-type flow meter outputs a pulse signal each time a set amount of fluid flows. In the present example embodiment, the pulse signal is transmitted to an acquisition unit 26 of the measurement apparatus 1 by using wired or wireless communications or the like. However, the flow measurement unit 22 is not limited to being a pulse transmission-type flow meter.

A supply line 23 (tubular structure 7) is a pipe that feeds the irrigation water of the supply tank 21 to the corresponding section 31. Specifically, the supply line 23 is an irrigation tube whose shape changes according to the supplied amount of the liquid flowing therein. Further, when any of the valves 25 (25a to 25d) corresponding to the supply lines 23 (23a to 23d) is opened, the irrigation water of the supply tank 21 is fed to the corresponding section 31.

A drip line 24 is a pipe branched from a supply line. Specifically, the drip line 24 is a common agricultural drip tube. Further, each of the drip lines 24a to 24d is arranged along a ridge of the corresponding section 31.

In the example shown in FIG. 2, the drip line 24a branches from the supply line 23a, the drip line 24b branches from the supply line 23b, the drip line 24c branches from the supply line 23c, and the drip line 24d branches from the supply line 23d.

Further, each drip line 24 is provided with drips (not shown) at regular intervals in the longitudinal direction. The drips can irrigate a certain amount of irrigation water in a dripping manner, and supply an optimal amount of irrigation water to the crop 40.

A valve 25 is a valve that is opened when liquid is fed from the supply tank 21 to the section 31. Specifically, the valves 25a, 25b, 25c, and 25d are opened for a certain period of time in a preset order to supply the irrigation water to a target section 31. Note that in the system 20, the valves 25 are opened one by one in a preset order. That is, when supply of the irrigation water to the target section 31 is completed, one valve currently in an open state is closed, and after this closing, the next valve 25 is opened.

Next, the measurement apparatus 1 will be described in detail. In FIG. 2, the measurement apparatus 1 has the acquisition unit 26 in addition to the detection unit 2, the time specification unit 3, and the supplied amount calculation unit 4.

The detection unit 2 detects a pressure according to a shape change of the tubular structure 7 whose shape changes according to the supplied amount of the liquid that flows therein. Also, the detection unit 2 has the measurement unit 5, the output unit 6, and connection units 8 (8a, 8b, and 8c).

Figure 3:
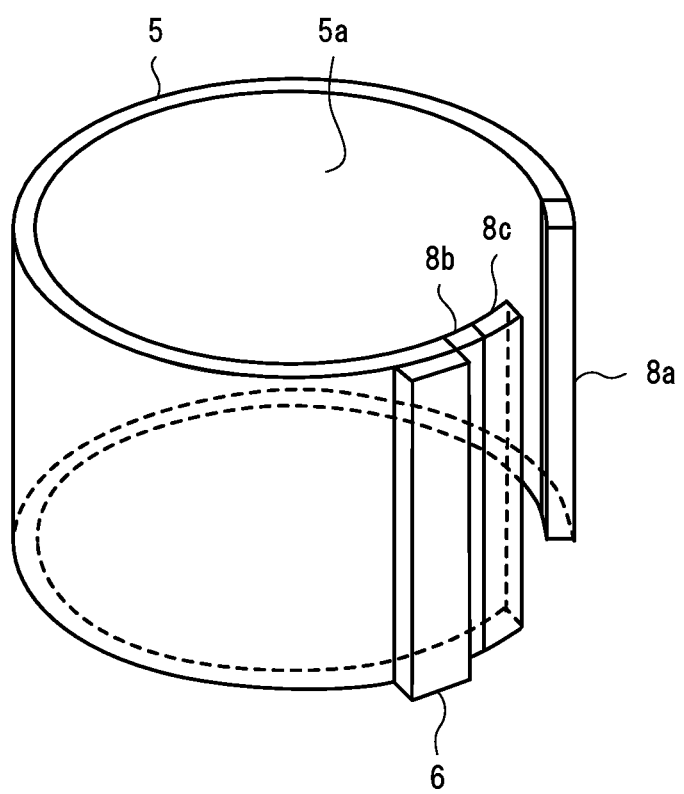
FIG. 3 is a perspective view showing an example of the structure of a detection unit.
Figure 4:
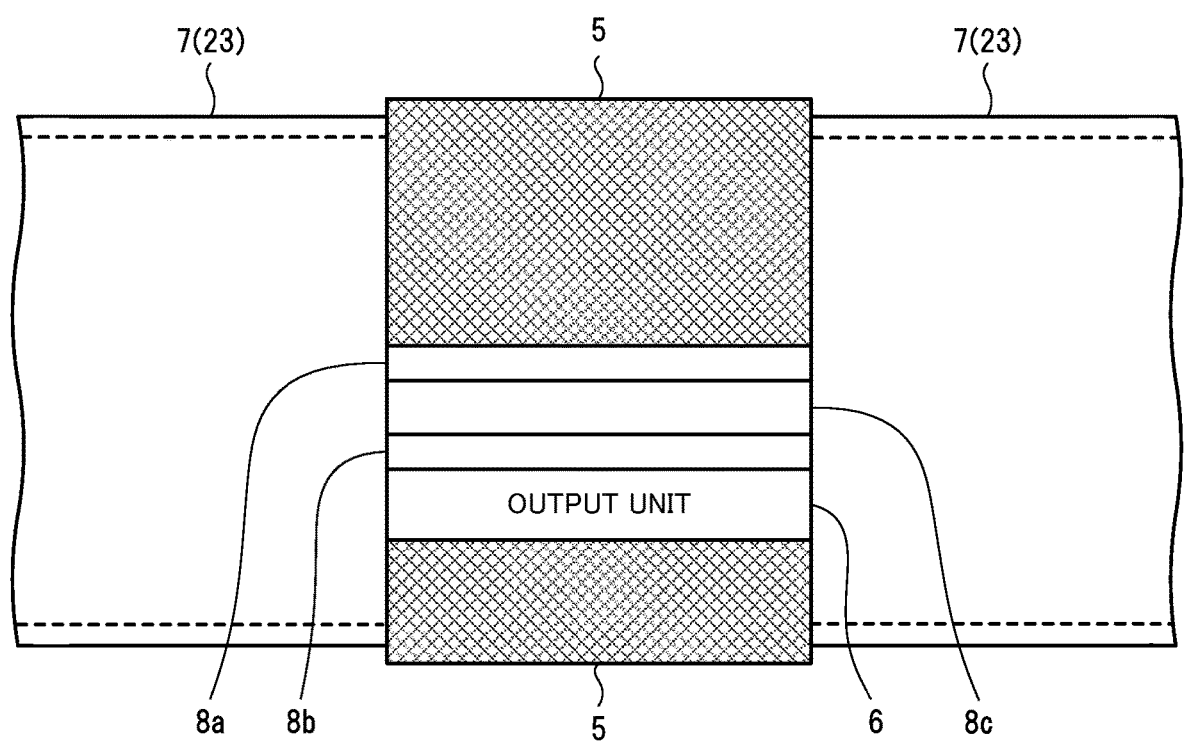
FIG. 4 shows a side view of a tubular structure and a measurement unit.
Figure 5:
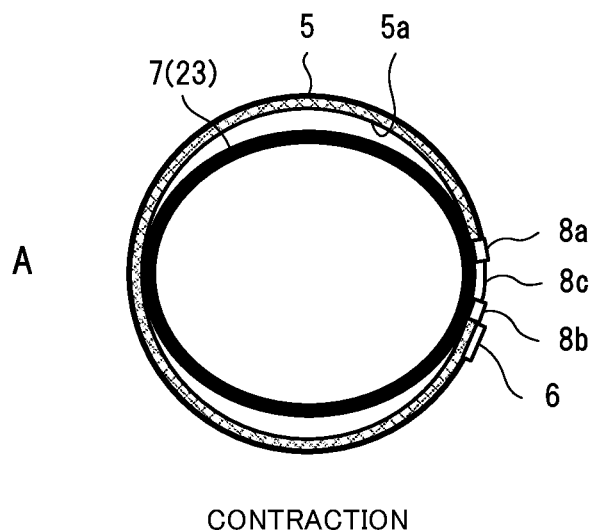
FIGS. 5A and 5B show cross-sections of the tubular structure and the measurement unit.
Figure 5:
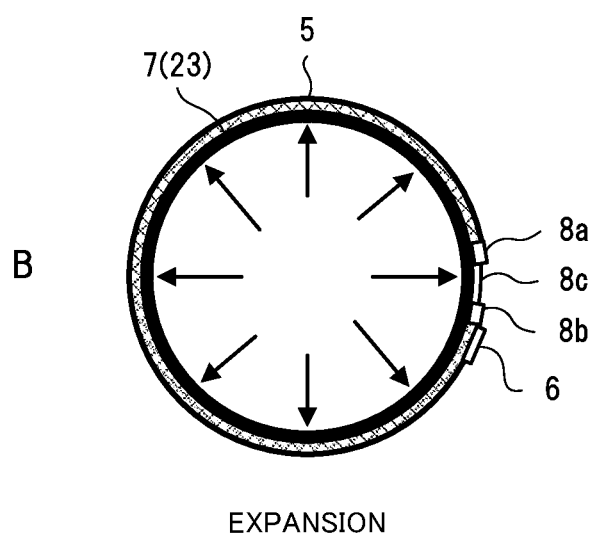

The detection unit 2 will be specifically described with reference to FIGS. 3, 4, and 5. FIG. 3 is a perspective view showing an example of the structure of a detection unit. FIG. 4 shows a side view of a tubular structure and a measurement unit. FIGS. 5A and 5B show cross-sections of the tubular structure and the measurement unit. FIG. 5A shows a case when the tubular structure is contracted, and FIG. 5B shows a case when the tubular structure is expanded.

As shown in FIG. 3, the detection unit 2 is connected in a state with the connection unit 8a fixed to one end (a tip side) of the measurement unit 5, and is connected in a state with the connection unit 8b fixed to the other end (a base end side) of the measurement unit 5. The connection unit 8c is connected in a state fixed to either the connection unit 8a or the connection unit 8b. Further, the length of the connection unit 8c can be adjusted. Also, during operation, as shown in FIG. 4, the detection unit 2 can be wound around the tubular structure 7 by connecting and fixing the connection unit 8a and the connection unit 8c. Therefore, the detection unit 2 can be attached without damaging the tubular structure 7. However, the method of attaching the detection unit 2 to the tubular structure 7 is not limited to the winding method described above, and it is sufficient that it is possible to attach the detection unit 2 to the tubular structure 7 and measure pressure. For example, the detection unit 2 may be spirally wound around the tubular structure 7.

As shown in FIG. 3, the measurement unit 5 measures the pressure generated by contact between a pressure detection side 5a of the measurement unit 5 and the exterior portion of the tubular structure 7. Specifically, the measurement unit 5 is a pressure-sensitive sensor or the like that measures the pressure applied to the pressure detection side 5a by the exterior portion of the tubular structure 7. As the pressure-sensitive sensor, it is conceivable to use a pressure-sensitive sensor using a pressure-sensitive resistor. A pressure-sensitive sensor using a pressure-sensitive resistor has a characteristic that resistance decreases as the pressure applied to the measuring unit 5 increases. Note that the pressure-sensitive sensor is not limited to being a sensor using a pressure-sensitive resistor, and another pressure-sensitive sensor may be used.

As shown in FIG. 5A, when the supplied amount of the liquid flowing inside the tubular structure 7 is small, the tubular structure 7 contracts (flattens). Therefore, since the pressure detected by the measurement unit 5 is small, the resistance value of the measurement unit 5 becomes large. Further, as shown in FIG. 5B, when the supplied amount of the liquid flowing inside the tubular structure 7 is large, the tubular structure 7 expands (swells). Therefore, the pressure detected by the measurement unit 5 becomes large, and the resistance value of the measurement unit 5 becomes small. Therefore, when the supplied amount of the liquid flowing inside the tubular structure 7 exceeds a predetermined amount, at least a certain pressure is applied to the measurement unit 5 from the exterior portion, so the resistance value measured by the measurement unit 5 is a certain value or less.

Next, the measurement unit 5 sends the measurement value corresponding to the resistance value to the output unit 6. The measurement value conceivably is, for example, a voltage value, a current value, or the like corresponding to the resistance value.

When the measurement value is acquired, the output unit 6 generates data (digital information or an analog signal) representing the acquired measurement value and transmits this to the acquisition unit 26. Specifically, the output unit 6 transmits the above-mentioned data and identification information corresponding to the section 31 to the acquisition unit 26 by using wired or wireless communications or the like.

The acquisition unit 26, using wired or wireless communications or the like, receives field identification information that identifies the sections 31 (A to D) of the field 30, date/time information indicating the date/time, and data representing the measurement value corresponding to the measured pressure, which were sent from the detection unit 2. Further, the acquisition unit 26, using wired or wireless communications or the like, receives date/time information indicating the date/time, and data measured by the flow measurement unit 22 (for example, such as a pulse signal), which were sent from the flow measurement unit 22.

Next, the acquisition unit 26 sends the received data to the time specification unit 3 and the supplied amount calculation unit 4. Also, the acquisition unit 26 stores data related to the detection unit 2 (the field identification information, the date/time information, and the data measured by the detection unit 2), and data related to the flow measurement unit 22 (the date/time information, and the data measured by the flow measurement unit 22), in a storage device (not shown) provided in the measurement apparatus 1 or a storage device (not shown) provided externally.

The time specification unit 3 specifies, based on the pressure detected by the detection unit 2, a supply time during which the liquid was supplied. Specifically, when the pressure detected by the detection unit 2 is at least a predetermined value and the time during which the pressure is at least the predetermined value continues for at least a predetermined time, the time specification unit 3 sets the date/time when the pressure became at least the predetermined value as a start date/time of supply of the liquid. Also, when the pressure changes from at least the predetermined value to less than the predetermined value and the time during which the pressure is less than the predetermined value continues for at least a predetermined time, the time specification unit 3 sets the date/time when the pressure became less than the predetermined value as an end date/time of supply of the liquid.

Figure 6:
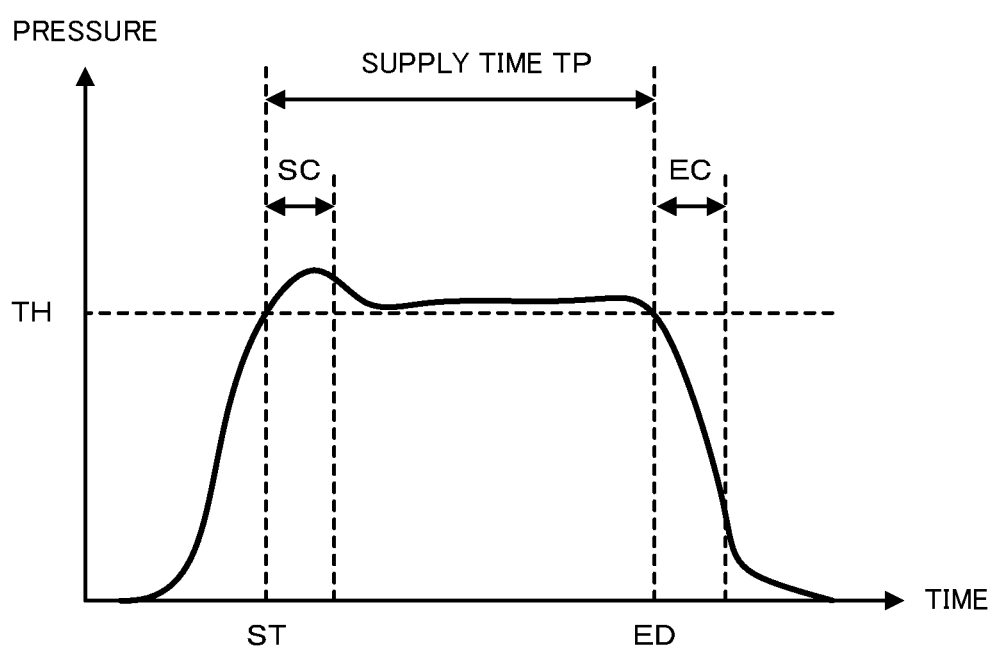
FIG. 6 illustrates the relationship between pressure and time when supplying a liquid.

The time specification unit 3 will be specifically described using the system 20 shown in FIG. 2. In the example shown in FIG. 2, there is only one flow measurement unit 22, so the valves 25a, 25b, 25c, and 25d are opened one by one in a predetermined order to supply a predetermined amount of the irrigation water to the corresponding section 31. FIG. 6 illustrates the relationship between pressure and time when supplying a liquid.

The time specification unit 3 first acquires the measurement value from the detection unit 2, which is attached to the supply line 23 that supplies the irrigation water to the section 31. When the pressure indicated by the measurement value becomes at least a predetermined value TH, the time specification unit 3 determines whether or not the pressure is at least the predetermined value TH for at least a predetermined time SC from a time ST. When the pressure is at least the predetermined value TH and has continued in this state for at least the predetermined time SC, the time specification unit 3 sets the date/time when the pressure became at least the predetermined value TH as the start date/time ST of supply of the liquid.

Next, when the pressure changes from at least the predetermined value TH to less than the predetermined value TH, the time specification unit 3 determines whether or not the pressure is less than the predetermined value TH for at least a predetermined time EC from a time ED. When the pressure is less than the predetermined value TH and this has continued for at least the predetermined time EC, the time specification unit 3 sets the date/time when the pressure became less than the predetermined value as the end date/time ED of supply of the liquid.

Next, the time specification unit 3, using the supply start date/time ST and the supply end date/time ED, specifies a supply time TP during which the irrigation water was supplied. Note that if the pressure is at least the predetermined value TH, the irrigation water is supplied to the crop 40 at a constant speed from the drips provided in the section 31.

The supplied amount calculation unit 4 calculates a supplied amount of the liquid during the supply time based on the supply time and the flow rate of the liquid that flows through the tubular structure 7. Specifically, the supplied amount calculation unit 4 first calculates the supplied amount of the liquid based on the number of times a pulse signal output by the flow measurement unit 22 was acquired. For example, a supplied amount FF of the liquid is calculated by multiplying a preset flow rate per pulse by the number of times a pulse was acquired.

Next, the supplied amount calculation unit 4 calculates a supplied amount FR of the liquid during the supply time TP. Specifically, the supplied amount calculation unit 4 calculates the supplied amount FR of the liquid during the supply time TP by multiplying the supply time TP by the supplied amount FF of the liquid per unit time. See Formula 1.

$$FR = TP \times FF \qquad \text{(Formula 1)}$$

FR: Supplied amount of liquid during supply time
TP: Supply time (period from ST to ED)
FF: Supplied amount of liquid per unit time The supplied amount calculation unit 4 will be specifically described using the system 20 shown in FIG. 2. When the valve 25a in FIG. 2 is opened, the supplied amount calculation unit 4 calculates the supplied amount FR of the irrigation water in the section 31(A) using the supply time TP in the section 31(A) corresponding to the valve 25a and the supplied amount FF of the irrigation water per unit time. Then, when the valve 25a is closed and the valve 25b is opened, the supplied amount calculation unit 4 calculates the supplied amount FR of the irrigation water in the section 31(B) using the supply time TP in the section 31(B) corresponding to the valve 25b and the supplied amount FF of the irrigation water per unit time. Similarly, when the valves 25c and 25d are opened, the supplied amount calculation unit 4 calculates the supplied amount FR of the irrigation water for the sections 31(C) and (D).

First Modified Example

In the above calculation of the supplied amount FR of the liquid during the supply time TP, the supplied amount calculation unit 4 used the supplied amount FF measured by the flow measurement unit 22. In this first modified example, the supplied amount calculation unit 4 uses a number N of drips provided in each section 31 and a supplied amount FD of the irrigation water per unit time supplied from one drip.

That is, in this first modified example, the supplied amount calculation unit 4 calculates the supplied amount FR of the liquid during the supply time TP by multiplying the supply time TP in the section 31, the number N of drips provided in that section 31, and the supplied amount FD of the irrigation water per unit time supplied from one drip. See Formula 2.

$$FR = TP \times N \times FD \quad \text{(Formula 2)}$$

FR: Supplied amount of liquid during supply time
TP: Supply time (period from ST to ED)
N: Number of drips in section
FD: Supplied amount of liquid per unit time supplied from one drip Second Modified Example In this second modified example, a supplied amount of fertilizer in liquid obtained by mixing the liquid with the fertilizer is calculated. Specifically, when the fertilizer is mixed with the liquid using a specific mixing ratio, the supplied amount calculation unit 4 calculates a supplied amount FP of the fertilizer during the supply time TP by multiplying the supply time TP in the section 31, the supplied amount FF of the liquid per unit time in the section 31, and a mixing ratio R. See Formula 3.

$$FR = TP \times FF \times R \quad \text{(Formula 3)}$$

FP: Supplied amount of fertilizer during supply time
TP: Supply time (period from ST to ED)
FF: Supplied amount of liquid per unit time
R: Mixing ratio Third Modified Example In the second modified example, the supplied amount calculation unit 4 calculated the supplied amount of the fertilizer using the supplied amount FF measured by the flow measurement unit 22, but in this third modified example, the supplied amount calculation unit 4 uses the number N of drips provided in each section 31 and the supplied amount FD of the irrigation water per unit time supplied from one drip.

That is, in the third modified example, the supplied amount calculation unit 4 calculates the supplied amount FP of the fertilizer during the supply time TP by multiplying the supply time TP in the section 31, the number N of drips provided in that section 31, the supplied amount FD of the irrigation water per unit time supplied from one drip, and the mixing ratio R. See Formula 4.

$$FP = TP \times N \times FD \times R \quad \text{(Formula 4)}$$

FP: Supplied amount of fertilizer during supply time
TP: Supply time (period from ST to ED)
N: Number of drips in section
FD: Supplied amount of liquid per unit time supplied from one drip
R: Mixing ratio

[Apparatus Operations]

Figure 7:
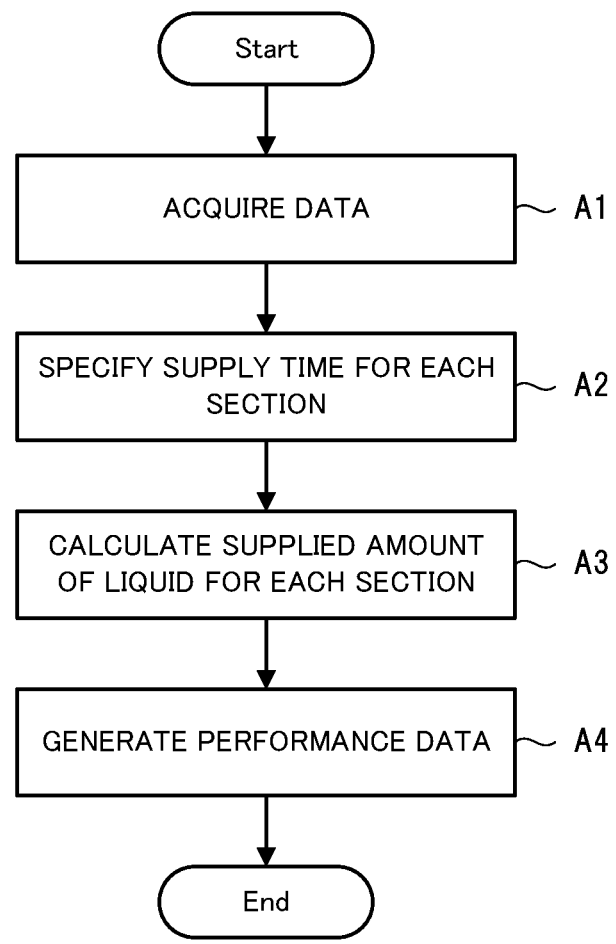
FIG. 7 illustrates an example of operation of the measurement apparatus.

Next, operation of the measurement apparatus according to a first example embodiment of the present invention will be described with reference to FIG. 7. FIG. 7 illustrates an example of operation of the measurement apparatus. In the following description, FIGS. 2 to 6 will be referred to as appropriate. Further, in the present example embodiment, a measurement method is implemented by operating the measurement apparatus 1. Therefore, the description of the measurement method in the present example embodiment is replaced with the following description of the operation of the measurement apparatus.

Operation of the measurement apparatus 1 will be specifically described using the system 20 shown in FIG. 2. In the example shown in FIG. 2, there is only one flow measurement unit 22, so the valves 25*a*, 25*b*, 25*c*, and 25*d* are opened one by one in a predetermined order to supply a predetermined amount of irrigation water to the corresponding section 31.

As shown in FIG. 7, first, the acquisition unit 26, using wired or wireless communications or the like, acquires date/time information indicating the date/time, data transmitted from the detection unit 2, and data transmitted from the flow measurement unit 22 (step A1).

In step A1, the acquisition unit 26 receives data related to the detection unit 2 (field identification information, date/time information, and data corresponding to the pressure measured by the detection unit 2), which was transmitted from the detection unit 2. Also, the acquisition unit 26, using wired or wireless communications or the like, receives data related to the flow measurement unit 22 (date/time information, and data corresponding to the flow rate measured by the flow measurement unit 22 (such as a pulse signal)), which was transmitted from the flow measurement unit 22.

Next, in step A1, the acquisition unit 26 sends the received data to the time specification unit 3 and the supplied amount calculation unit 4. Also, the acquisition unit 26 stores the date/time information indicating the date/time, the data transmitted from the detection unit 2, and the pulse signal transmitted from the flow measurement unit 22 in a storage device (not shown) provided in the measurement device 1 or in a storage device (not shown) provided externally.

Next, the time specification unit 3 specifies the supply time during which the liquid was supplied based on the pressure detected by the detection unit 2 (step A2).

In step A2, when the pressure detected by the detection unit 2 is at least a predetermined value and the time during which the pressure is at least the predetermined value continues for at least a predetermined time, the time specification unit 3 sets the date/time when the pressure became at least the predetermined value as a start date/time of supply of the liquid. Also, when the pressure changes from at least the predetermined value to less than the predetermined value and the time during which the pressure is less than the predetermined value continues for at least a predetermined time, the time specification unit 3 sets the date/time when the pressure became less than the predetermined value as an end date/time of supply of the liquid.

Specifically, in step A2, as shown in FIG. 6, when the pressure indicated by the measurement value becomes at least a predetermined value TH, the time specification unit 3 determines whether or not the pressure is at least the predetermined value TH for at least a predetermined time SC from a time ST. When the pressure is at least the predetermined value TH and has continued in this state for at least the predetermined time SC, the time specification unit 3 sets the date/time when the pressure became at least the predetermined value TH as the start date/time ST of supply of the liquid.

Next, in step A2, as shown in FIG. 6, when the pressure changes from at least the predetermined value TH to less than the predetermined value TH, the time specification unit 3 determines whether or not the pressure is less than the predetermined value TH for at least a predetermined time EC from a time ED. When the pressure is less than the predetermined value TH and this has continued for at least the predetermined time EC, the time specification unit 3 sets the date/time when the pressure became less than the predetermined value as the end date/time ED of supply of the liquid.

Next, in step A2, as shown in FIG. 6, the time specification unit 3 specifies the supply time TP during which irrigation water was supplied using the supply start date/time ST and the supply end date/time ED.

Next, the supplied amount calculation unit 4 calculates the supplied amount of the liquid during the supply time based on the supply time and the flow rate of the liquid that flows through the tubular structure 7 (step A3).

In step A3, the supplied amount calculation unit 4 first calculates the supplied amount of the liquid based on the number of times that a pulse signal output by the flow measurement unit 22 was acquired. For example, the supplied amount FF of the liquid is calculated by multiplying the preset flow rate per pulse by the number of times a pulse was acquired.

Next, in step A3, the supplied amount calculation unit 4 calculates a supplied amount FR of the liquid during the supply time TP. Specifically, the supplied amount calculation unit 4 calculates the supplied amount FR of the liquid during the supply time TP by multiplying the supply time TP by the supplied amount FF of the liquid per unit time. See above Formula 1.

Specifically, when the valve 25a in FIG. 2 is opened, the supplied amount calculation unit 4 calculates the supplied amount FR of the irrigation water in the section 31(A) using the supply time TP in the section 31(A) corresponding to the valve 25a and the supplied amount FF of the irrigation water per unit time.

Next, when the valve 25a is closed and the valve 25b is opened, the supplied amount calculation unit 4 calculates the supplied amount FR of the irrigation water in the section 31(B) using the supply time TP in the section 31(B) corresponding to the valve 25b and the supplied amount FF of the irrigation water per unit time.

Next, when the valve 25b is closed and the valve 25c is opened, the supplied amount calculation unit 4 calculates the supplied amount FR of the irrigation water in the section 31(C) using the supply time TP in the section 31(C) corresponding to the valve 25c and the supplied amount FF of the irrigation water per unit time.

Next, when the valve 25c is closed and the valve 25d is opened, the supplied amount calculation unit 4 calculates the supplied amount FR of the irrigation water in the section 31(D) using the supply time TP in the section 31(D) corresponding to the valve 25d and the supplied amount FF of the irrigation water per unit time.

Next, the supplied amount calculation unit 4 generates performance data (step A4). The performance data is, for example, data in which at least the liquid supply time TP (the period from ST to ED), the supplied amount FR of the liquid, the supplied amount FP of the fertilizer, the mixing ratio R, and the like are associated with each section 31. Further, as the performance data, the total supplied amount of the liquid supplied to the field 30 shown in FIG. 2 may be included.

Next, in step A4, the supplied amount calculation unit 4 stores the performance data in the storage device described above.

Note that the performance data can be output to an unshown output device (for example, a monitor, a printer, or the like) configured to be connected to the measurement apparatus 1.

First Modified Example

In above step A3, when calculating the supplied amount FR of the liquid during the supply time TP, the supplied amount calculation unit 4 used the supplied amount FF measured by the flow measurement unit 22. In this first modified example, the supplied amount calculation unit 4 uses a number N of drips provided in each section 31 and a supplied amount FD of the irrigation water per unit time supplied from one drip to calculate the supplied amount FR. That is, in the modified example in step A3, the supplied amount calculation unit 4 calculates the supplied amount FR of the liquid during the supply time TP by multiplying the supply time TP in the section 31, the number N of drips provided in that section 31, and the supplied amount FD of the irrigation water per unit time supplied from one drip. See above Formula 2.

Second Modified Example

As a modified example of step A3, a supplied amount of fertilizer in liquid obtained by mixing the liquid with the fertilizer may be calculated. Specifically, when the fertilizer is mixed with the liquid using a specific mixing ratio, the supplied amount calculation unit 4 calculates a supplied amount FP of the fertilizer during the supply time TP by multiplying the supply time TP in the section 31, the supplied amount FF of the liquid per unit time in the section 31, and a mixing ratio R. See above Formula 3.

Third Modified Example

As a modified example of step A3, the supplied amount calculation unit 4 may calculate the supplied amount of the fertilizer using the number N of drips provided in each section 31 and the supplied amount FD of the irrigation water per unit time supplied from one drip. In this third modified example, the supplied amount calculation unit 4 calculates the supplied amount FP of the fertilizer during the supply time TP by multiplying the supply time TP in the section 31, the number N of drips provided in that section 31, the supplied amount FD of the irrigation water per unit time supplied from one drip, and the mixing ratio R. See above Formula 4.

[Effects of Present Example Embodiment]

As described above, according to the present example embodiment, the measurement apparatus 1 can detect the pressure corresponding to the shape change of the tubular structure 7 by using the detection unit 2, which is attached to the tubular structure 7. Specifically, in the measurement apparatus 1, the measurement unit 5 of the detection unit 2 is attached to the exterior portion of the tubular structure 7, and the measurement apparatus 1 can measure the pressure (pressure sensitivity) that the tubular structure 7 applies to the measurement unit 5 according to the shape change of the tubular structure 7.

Further, according to the present example embodiment, since the supply time during which the liquid was supplied to the tubular structure 7 can be specified based on the detected pressure, it is possible to calculate the supplied amount of the liquid based on the supply time. As a result, the supplied amount of the liquid can be delicately managed.

Also, the supplied amount of the fertilizer can be calculated based on the supply time and the fertilizer mixing ratio, so it is possible to delicately manage the supplied amount of the fertilizer. For example, this can be used for agricultural regulation of the fertilizer.

Also, according to the present example embodiment, since the liquid supply time can be specified, it is possible to confirm whether the supplied amount of the liquid was appropriate. That is, it is possible to confirm whether the supplied amount of the liquid was appropriate without using the work record created by a worker.

Furthermore, according to the present example embodiment, the detection unit 2 can be attached to the exterior portion of the irrigation tube without damaging the irrigation tube, so it is possible to avoid voiding the manufacturer's warranty of the drip irrigation equipment. Further, since the detection unit 2 is attached by merely winding the detection unit 2 around the irrigation tube, it is possible to suppress an increase in the cost of the drip irrigation equipment as compared with the conventional technology.

Also, if the detection unit 2 is installed outside the cultivated area of the field 30, work will not be hindered.

Also, when making a farming management decision, it is possible to effectively support the farming management decision by displaying the irrigation amount for each section and using the performance data obtained by generating a supplied amount of irrigation water on a daily basis.

Also, by performing machine learning using the performance data generated using the measurement apparatus 1, constructing a learning model, and using the learning model, it is possible to obtain highly accurate results in farming management decisions.

[Program]

The program according to an example embodiment of the present invention may be a program that causes a computer to execute steps A1 to A3 shown in FIG. 7. By installing this program in a computer and executing the program, the measurement apparatus and the measurement method according to this example embodiment can be realized. In this case, a processor of the computer functions as the acquisition unit 26, the time specification unit 3, and the supplied amount calculation unit 4 to performs processing.

Also, the program according to this example embodiment may be executed by a computer system constructed by a plurality of computers. In this case, for example, each computer may respectively function as any of the acquisition unit 26, the time specification unit 3, and the supplied amount calculation unit 4.

[Physical Configuration]

Figure 8:
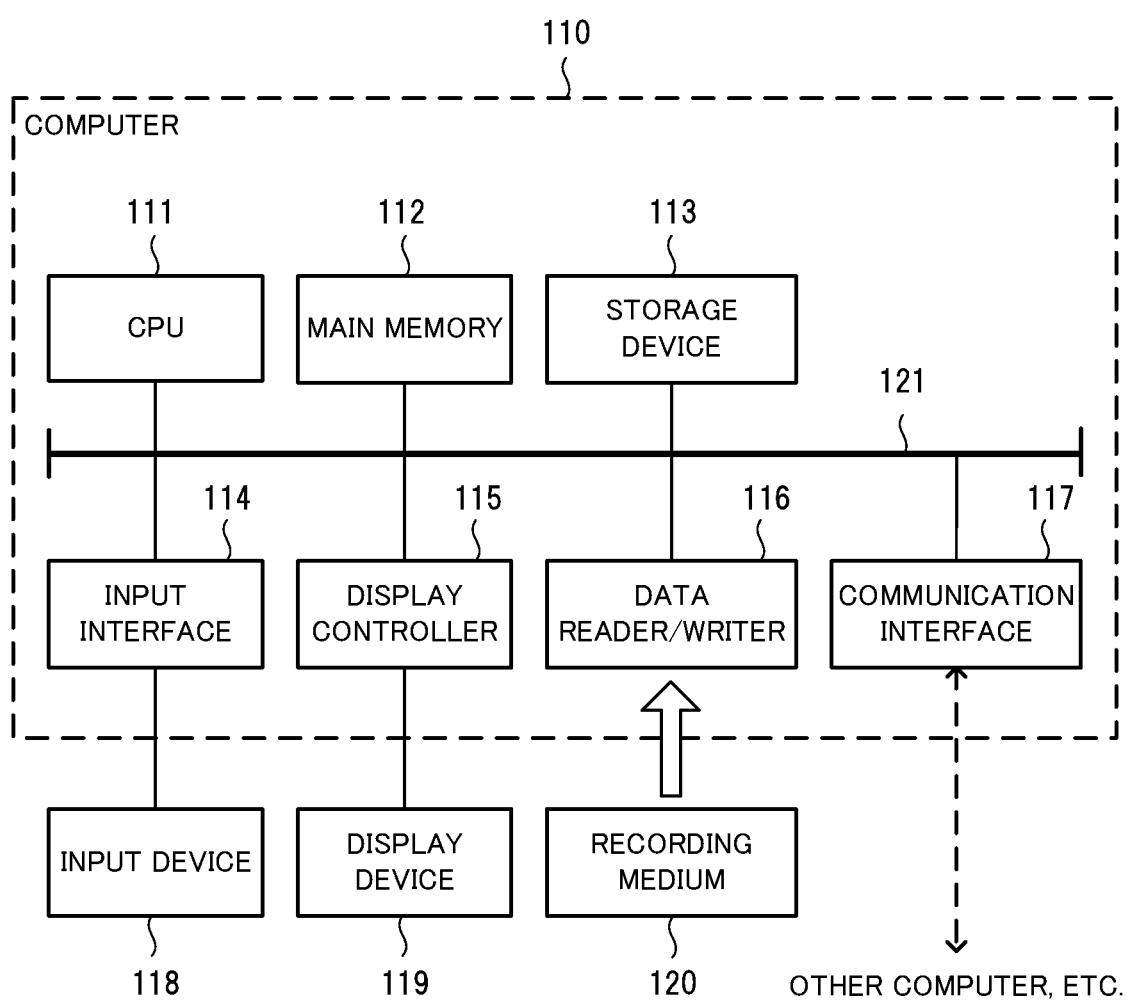
FIG. 8 illustrates an example of a computer that realizes the measurement apparatus.

Here, a computer that realizes a measurement apparatus by executing the program according to an example embodiment will be described with reference to FIG. 8. FIG. 8 illustrates an example of a computer that realizes the measurement apparatus according to an example embodiment of the present invention.

As shown in FIG. 8, a computer 110 includes a CPU (Central Processing Unit) 111, a main memory 112, a storage device 113, an input interface 114, a display controller 115, a data reader/writer 116, and a communications interface 117. These units are each connected so as to be capable of performing data communications with each other through a bus 121. Note that the computer 110 may include a GPU (Graphics Processing Unit) or an FPGA (Field-Programmable Gate Array) in addition to the CPU 111 or in place of the CPU 111.

The CPU 111 opens the program (code) according to these example embodiments, which has been stored in the storage device 113, in the main memory 112 and performs various operations by executing the program in a predetermined order. The main memory 112 is typically a volatile storage device such as a DRAM (Dynamic Random Access Memory). Also, the program according to this example embodiment is provided in a state being stored in a computer-readable recording medium 120. Note that the program according to this example embodiment may be distributed on the Internet, which is connected through the communications interface 117.

Also, other than a hard disk drive, a semiconductor storage device such as a flash memory can be given as a specific example of the storage device 113. The input interface 114 mediates data transmission between the CPU 111 and an input device 118, which may be a keyboard or mouse. The display controller 115 is connected to a display device 119, and controls display on the display device 119.

The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

Also, instead of a computer in which a program is installed, the measurement apparatus 1 according to this example embodiment can also be realized by using hardware corresponding to each unit. Furthermore, a portion of the measurement apparatus 1 may be realized by a program, and the remaining portion realized by hardware.

[Supplementary Notes]

Regarding the above example embodiments, the following supplementary notes are further disclosed. Some portion or all of the example embodiments described above can be realized according to (supplementary note 1) to (supplementary note 16) described below, but the below description does not limit the present invention.

(Supplementary Note 1)

A measurement apparatus including:
- a detection unit configured to detect a pressure according to a shape change of a tubular structure whose shape changes according to a supplied amount of a liquid that flows therein;
- a time specification unit configured to specify, based on the pressure detected by the detection unit, a supply time during which the liquid was supplied; and
- a supplied amount calculation unit configured to calculate a supplied amount of the liquid based on the supply time.

(Supplementary Note 2)

The measurement apparatus according to supplementary note 1,
wherein the detection unit includes:
- a measurement unit that is attached to an exterior portion of the tubular structure, and is configured to measure a measurement value corresponding to the pressure that occurs due to contact with the exterior portion, and
- an output unit configured to output information or a signal representing the measurement value to the time specification unit.

(Supplementary Note 3)

The measurement apparatus according to supplementary note 2,
wherein when the pressure detected by the detection unit is at least a predetermined value and the time during which the pressure is at least the predetermined value continues for at least a predetermined time, the time specification unit sets the date/time when the pressure became at least the predetermined value as a start date/time of supply of the liquid, and when the pressure changes from at least the predetermined value to less than the predetermined value and the time during which the pressure is less than the predetermined value continues for at least a predetermined time, the time specification unit sets the date/time when the pressure became less than the predetermined value as an end date/time of supply of the liquid.

(Supplementary Note 4)

The measurement apparatus according to any one of supplementary notes 1 to 3,
 wherein the supplied amount calculation unit calculates the supplied amount of the liquid during the supply time based on the supply time and a supplied amount per unit of the liquid that flows through the tubular structure.

(Supplementary Note 5)

The measurement apparatus according to supplementary note 4,
 wherein when feeding the liquid to a section obtained by dividing a field in which drip irrigation is adopted into a plurality of sections, a flow measurement unit is installed downstream of a supply source, the tubular structure that feeds the liquid to the section is installed, and the detection unit is attached to the tubular structure installed in the section, and
 the supplied amount calculation unit calculates a supplied amount of the liquid during the supply time in the section based on the supply time in the section and a supplied amount per unit of the liquid calculated from a flow rate measured by the flow measurement unit.

(Supplementary Note 6)

The measurement apparatus according to supplementary note 5,
 wherein when a fertilizer is mixed with the liquid using a specific mixing ratio, the supplied amount calculation unit calculates a supplied amount of the fertilizer during the supply time by using the supply time, a supplied amount per unit of the liquid, and the mixing ratio.

(Supplementary Note 7)

A measurement method including:
(a) a step of detecting a pressure according to a shape change of a tubular structure whose shape changes according to a supplied amount of a liquid that flows therein;
(b) a step of specifying, based on the detected pressure, a supply time during which the liquid was supplied; and
(c) a step of calculating a supplied amount of the liquid based on the supply time.

(Supplementary Note 8)

The measurement method according to supplementary note 7,
 wherein in the (b) step, when the detected pressure is at least a predetermined value and the time during which the pressure is at least the predetermined value continues for at least a predetermined time, the date/time when the pressure became at least the predetermined value is set as a start date/time of supply of the liquid, and when the pressure changes from at least the predetermined value to less than the predetermined value and the time during which the pressure is less than the predetermined value continues for at least a predetermined time, the date/time when the pressure became less than the predetermined value is set as an end date/time of supply of the liquid.

(Supplementary Note 9)

The measurement method according to supplementary note 7 or 8,
 wherein in the (c) step, a supplied amount of the liquid during the supply time is calculated based on the supply time and a supplied amount per unit of the liquid that flows through the tubular structure.

(Supplementary Note 10)

The measurement apparatus according to supplementary note 9,
 wherein when feeding the liquid to a section obtained by dividing a field in which drip irrigation is adopted into a plurality of sections,
 in the (c) step, a supplied amount of the liquid during the supply time in the section is calculated based on the supply time in the section and a supplied amount per unit of the liquid calculated from a flow rate measured downstream of a supply source.

(Supplementary Note 11)

The measurement method according to supplementary note 10,
 wherein in the (c) step, when a fertilizer is mixed with the liquid using a specific mixing ratio, a supplied amount of the fertilizer during the supply time by using the supply time, a supplied amount per unit of the liquid, and the mixing ratio.

(Supplementary Note 12)

A computer-readable recording medium including a program recorded thereon, the program including instructions that cause a computer to carry out:
(a) a step of acquiring a pressure according to a shape change of a tubular structure whose shape changes according to a supplied amount of a liquid that flows therein;
(b) a step of specifying, based on the acquired pressure, a supply time during which the liquid was supplied; and
(c) a step of calculating a supplied amount of the liquid based on the supply time.

(Supplementary Note 13)

The computer-readable recording medium according to supplementary note 12,
 wherein in the (b) step, when the detected pressure is at least a predetermined value and the time during which the pressure is at least the predetermined value continues for at least a predetermined time, the date/time when the pressure became at least the predetermined value is set as a start date/time of supply of the liquid, and when the pressure changes from at least the predetermined value to less than the predetermined value and the time during which the pressure is less than the predetermined value continues for at least a predetermined time, the date/time when the pressure became less than the predetermined value is set as an end date/time of supply of the liquid.

(Supplementary Note 14)

The computer-readable recording medium according to supplementary note 12 or 13,
 wherein in the (c) step, a supplied amount of the liquid during the supply time is calculated based on the supply time and a supplied amount per unit of the liquid that flows through the tubular structure.

(Supplementary Note 15)

The computer-readable recording medium according to supplementary note 14, wherein when feeding the liquid to a section obtained by dividing a field in which drip irrigation is adopted into a plurality of sections, in the (c) step, a supplied amount of the liquid during the supply time in the section is calculated based on the supply time in the section and a supplied amount per unit of the liquid calculated from a flow rate measured downstream of a supply source.

(Supplementary Note 16)

The computer-readable recording medium according to supplementary note 15, wherein in the (c) step, when a fertilizer is mixed with the liquid using a specific mixing ratio, a supplied amount of the fertilizer during the supply time is calculated by using the supply time, a supplied amount per unit of the liquid, and the mixing ratio.

Although the invention of this application has been described with reference to exemplary embodiments, the invention of this application is not limited to the above exemplary embodiments. Within the scope of the invention of this application, various changes that can be understood by those skilled in the art can be made to the configuration and details of the invention of this application.

This application is based upon and claims the benefit of priority from Japanese application No. 2018-172724, filed on Sep. 14, 2018, the disclosure of which is incorporated herein in its entirety by reference.

INDUSTRIAL APPLICABILITY

As described above, according to the present invention, it is possible to manage the supplied amount of a liquid while suppressing an increase in the cost of equipment using a tubular structure. The present invention is useful for equipment using a tubular structure, particularly drip irrigation equipment.

REFERENCE SIGNS LIST

1 Measurement apparatus
2 Detection unit
3 Time specification unit
4 Supplied amount calculation unit
5 Measurement unit
5a Pressure detection side
6 Output unit
7 Tubular structure
8a, 8b, 8c Connection unit
20 System
21 Supply tank
22 Flow measurement unit
23, 23a, 23b, 23c, 23d Supply line
24, 24a, 24b, 24c, 24d Drip line
25, 25a, 25b, 25c, 25d Valve
26 Acquisition unit
30 Field
31 Section
40 Crop
110 Computer
111 CPU
112 Main memory
113 Storage device
114 Input interface
115 Display controller
116 Data reader/writer
117 Communications interface
118 Input device
119 Display device
120 Recording medium
121 Bus

What is claimed is:

1. A measurement apparatus comprising:
a flow meter that is installed downstream of a liquid supply source, and that measures a flow rate of liquid when the liquid is supplied to a given section of a plurality of sections into which a field has been divided for drip irrigation;
a pressure sensor that is attached to a tubular structure installed in the section that supplies the liquid to the given section, and that detects a pressure according to a shape change of the tubular structure, the tubular structure having a shape that changes according to supplied amount of the liquid that flows in the tubular structure;
a processor; and
a memory storing instructions executable by the processor to:
specify, based on the pressure that has been detected, a length of time during which the liquid was supplied;
calculate a supplied amount per unit of the liquid from the flow rate that has been measured; and
calculate the supplied amount of the liquid during the length of time, based on the length of time that has been calculated and based on the supplied amount per unit of the liquid that has been calculated.

2. The measurement apparatus according to claim 1, wherein the pressure sensor is attached to an exterior portion of the tubular structure, and outputs information or a signal representing a measurement value corresponding to the pressure and that occurs due to contact with the exterior portion.

3. The measurement apparatus according to claim 2, wherein
when the pressure that has been detected is at least a predetermined value for at least a predetermined time, a date/time when the pressure became at least the predetermined value is set as a start date/time of supply of the liquid, and
when the pressure that has been detected changes from at least the predetermined value to less than the predetermined value for at least the predetermined time, a date/time when the pressure became less than the predetermined value as an end date/time of supply of the liquid.

4. The measurement apparatus according to claim 1, wherein when a fertilizer is mixed with the liquid using a specific mixing ratio, a supplied amount of the fertilizer during the length of time is calculated by using the length of time, the supplied amount per unit of the liquid, and the specific mixing ratio.

5. A measurement method comprising:
measuring, by a flow meter that is installed downstream of a liquid supply source, a flow rate of liquid when the liquid is supplied to a given section of a plurality of sections into which a field has been divided for drip irrigation;
detecting, by a pressure sensor that is attached to a tubular structure installed in the section that supplies the liquid to the given section, a pressure according to a shape change of the tubular structure, the tubular structure having a shape that changes according to supplied amount of the liquid that flows in the tubular structure;

specifying, by a processor and based on the pressure that has been detected, a length of time during which the liquid was supplied;

calculating, by the processor, a supplied amount per unit of the liquid from the flow rate that has been measured; and calculating, by the processor, the supplied amount of the liquid during the length of time, based on the length of time that has been calculated and based on the supplied amount per unit of the liquid that has been calculated.

6. The measurement method according to claim 5, wherein when the pressure that has been detected is at least a predetermined value for at least a predetermined time, a date/time when the pressure became at least the predetermined value is set as a start date/time of supply of the liquid, and when the pressure that has been detected changes from at least the predetermined value to less than the predetermined value for at least the predetermined time, a date/time when the pressure became less than the predetermined value as an end date/time of supply of the liquid.

7. The measurement method according to claim 5, wherein when a fertilizer is mixed with the liquid using a specific mixing ratio, a supplied amount of the fertilizer during the length of time is calculated by using the length of time, the supplied amount per unit of the liquid, and the specific mixing ratio.

8. A non-transitory computer-readable recording medium storing a program executable by a computer to perform recorded:

receiving, from a flow meter installed downstream of a liquid supply source, a flow rate of liquid when the liquid is supplied to a given section of a plurality of sections into which a field has been divided for drip irrigation, the flow rate of liquid measured by the flow meter;

receiving, from a pressure sensor that is attached to a tubular structure installed in the section that supplies the liquid to the given section, a pressure according to a shape change of the tubular structure, the tubular structure having a shape that changes according to supplied amount of the liquid that flows in the tubular structure;

specifying, based on the pressure that has been received, a length of time during which the liquid was supplied;

calculating a supplied amount per unit of the liquid from the flow rate that has been received; and calculating the supplied amount of the liquid during the length of time, based on the length of time that has been calculated and based on the supplied amount per unit of the liquid that has been calculated.

9. The non-transitory computer-readable recording medium according to claim 8, wherein when the pressure that has been detected is at least a predetermined value for at least a predetermined time, a date/time when the pressure became at least the predetermined value is set as a start date/time of supply of the liquid, and when the pressure that has been detected changes from at least the predetermined value to less than the predetermined value for at least the predetermined time, a date/time when the pressure became less than the predetermined value as an end date/time of supply of the liquid.

10. The non-transitory computer-readable recording medium according to claim 8, wherein when a fertilizer is mixed with the liquid using a specific mixing ratio, a supplied amount of the fertilizer during the length of time is calculated by using the length of time, the supplied amount per unit of the liquid, and the specific mixing ratio.

* * * * *